US009782962B2

(12) United States Patent
Hanks et al.

(10) Patent No.: US 9,782,962 B2
(45) Date of Patent: Oct. 10, 2017

(54) COMPOSITE MATERIAL, A BALLISTIC RESISTANT ARTICLE MADE FROM SAME AND METHOD OF MAKING THE ARTICLE

(71) Applicant: E I DU PONT DE NEMOURS AND COMPANY, Wilmington, DE (US)

(72) Inventors: Jeffrey Alan Hanks, Midlothian, VA (US); Brian Charles West, Wilmington, DE (US); John Henry McMinn, Newark, DE (US); Bryce Vanarsdalen, Cherry Hill, NJ (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 149 days.

(21) Appl. No.: 14/709,518

(22) Filed: May 12, 2015

(65) Prior Publication Data
US 2015/0360457 A1    Dec. 17, 2015

Related U.S. Application Data

(60) Division of application No. 13/545,503, filed on Jul. 10, 2012, now abandoned, and a continuation-in-part
(Continued)

(51) Int. Cl.
*B32B 37/18* (2006.01)
*B32B 38/00* (2006.01)
(Continued)

(52) U.S. Cl.
CPC .......... *B32B 38/0004* (2013.01); *A42B 3/063* (2013.01); *B29C 70/222* (2013.01);
(Continued)

(58) Field of Classification Search
CPC ....... B32B 38/0004; B32B 5/024; B32B 5/12; B32B 5/26; B32B 7/02; A42B 3/063;
(Continued)

(56) References Cited

U.S. PATENT DOCUMENTS 2,115,065 A    4/1938  Dym
2,610,322 A *  9/1952  Daly ................. A42B 3/06
                                                  2/412
(Continued)

FOREIGN PATENT DOCUMENTS

WO    WO 02/084202 A1    10/2002
WO    WO 2006/016362 A2   2/2008
WO    WO 2006/016362 A3   2/2008

OTHER PUBLICATIONS

W. Black et al., Man-Made Fibres—Science and Technology, vol. 2, Section titled Fibre-Forming Aromatic Polyamides, p. 297, Interscience Publishers, 1968.
(Continued)

*Primary Examiner* — Michael N Orlando
*Assistant Examiner* — Elizabeth Bradford

(57) ABSTRACT

A fiber reinforced resin composite for ballistic protection comprising a plurality of first and second plies wherein the first and second plies further comprise a woven fabric and a polymeric resin. The fabric has a Russell tightness factor of from 0.2 to 0.7 and a cover factor of at least 0.45, The fabric is impregnated with the resin, the resin comprising from 5 to 30 weight percent of the total weight of fabric plus resin. The fabric of each first and second ply comprises regions wherein the fabric is distorted from an orthogonal woven state by a distortion angle of least 30 degrees. The composite may further comprising a third ply having a surface area no greater than 50% of the surface area of a first and second ply. The ratio of the number of first plus second plies to the number of third plies is from 2:1 to 12:1.

5 Claims, 5 Drawing Sheets

Related U.S. Application Data of application No. 13/274,590, filed on Oct. 17, 2011, now abandoned.

(51) Int. Cl.

| | | |
|---|---|---|
| *F41H 1/08* | (2006.01) | |
| *B32B 7/02* | (2006.01) | |
| *B32B 5/12* | (2006.01) | |
| *A42B 3/06* | (2006.01) | |
| *B29C 70/56* | (2006.01) | |
| *B29C 70/22* | (2006.01) | |
| *F41H 5/04* | (2006.01) | |
| *B32B 5/02* | (2006.01) | |
| *B32B 5/26* | (2006.01) | |
| *B29L 31/48* | (2006.01) | |
| *B29L 31/00* | (2006.01) | |
| *A42C 2/00* | (2006.01) | |

(52) U.S. Cl.
CPC .............. *B29C 70/56* (2013.01); *B32B 5/024* (2013.01); *B32B 5/12* (2013.01); *B32B 5/26* (2013.01); *B32B 7/02* (2013.01); *F41H 1/08* (2013.01); *F41H 5/0485* (2013.01); *A42C 2/00* (2013.01); *B29L 2031/4821* (2013.01); *B29L 2031/768* (2013.01); *B32B 2260/021* (2013.01); *B32B 2260/046* (2013.01); *B32B 2305/188* (2013.01); *B32B 2307/718* (2013.01); *B32B 2309/06* (2013.01); *B32B 2571/02* (2013.01); *Y10T 156/1075* (2015.01); *Y10T 428/24942* (2015.01)

(58) Field of Classification Search
CPC ......... B29C 70/222; B29C 70/56; F41H 1/08; F41H 5/0485
USPC ...... 156/264, 265; 2/2.5, 410, 411, 412, 414
See application file for complete search history.

(56) References Cited

U.S. PATENT DOCUMENTS

| | | | |
|---|---|---|---|
| 2,956,916 A | | 10/1960 | Voss et al. |
| 2,960,424 A | * | 11/1960 | Bjorholm ............... B29C 70/00 428/111 |
| 3,404,134 A | | 10/1968 | Rees |
| 3,582,990 A | | 6/1971 | Frieder |
| 4,596,056 A | | 6/1986 | Grick |
| 4,613,535 A | * | 9/1986 | Harpell ...................... C08J 5/24 2/2.5 |
| 4,656,674 A | | 4/1987 | Medwell |
| 4,778,638 A | | 10/1988 | White |
| 4,953,234 A | | 9/1990 | Li et al. |
| 6,475,936 B1 | | 11/2002 | Chiou |
| 6,922,847 B2 | * | 8/2005 | Bachner, Jr. .......... F41H 5/0485 2/2.5 |
| 7,228,571 B2 | | 6/2007 | Cheese |

OTHER PUBLICATIONS

F. C. Campbell, Manufacturing Processes for Advanced Composites, Section 2.9, Elsevier, 2004.
Bhatnagar, Ashok, "Lightweight Ballistic Composites", Military and Law-Enforcement Applications, Woodhead Publishing Limited, Cambridge, England 2006.
Body Armor, National Institute of Justice, http://www.nij.gov/topics/technology/body-armor/Pages/welcome.aspx, Oct. 15, 2014.
Body Armor 101, http://blog.refactortactical.com/body-armor-101, Oct. 15, 2014.
Pursuit Magazine, "Everything You've Ever Wanted to Know About Body Armor and Protective Clothing", 2002, http://pursuitmag.com, Oct. 15, 2014.

* cited by examiner

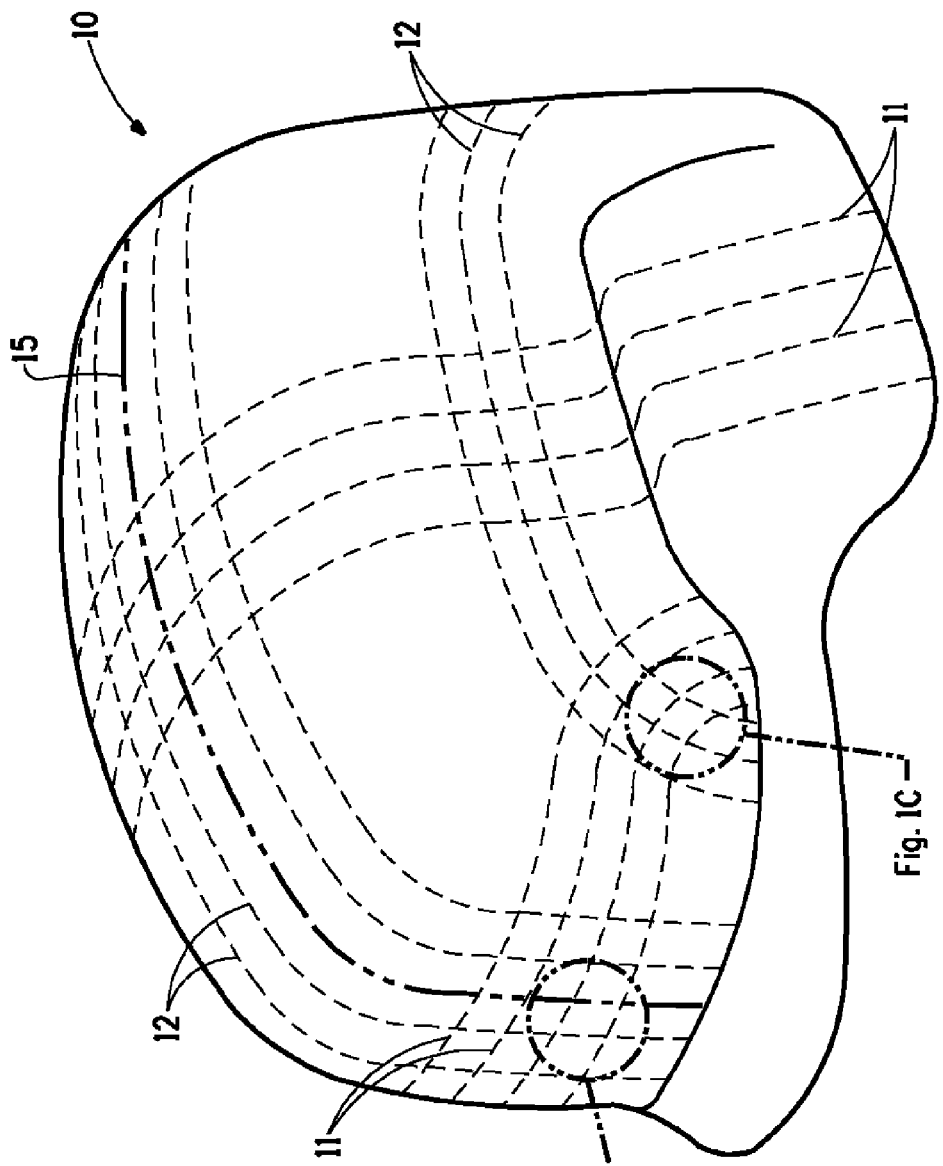
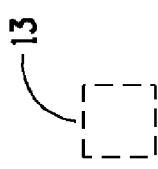
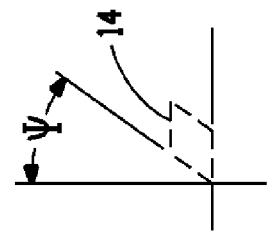
FIG. 1A
FIG. 1B
FIG. 1C

COMPOSITE MATERIAL, A BALLISTIC RESISTANT ARTICLE MADE FROM SAME AND METHOD OF MAKING THE ARTICLE

RELATED APPLICATION

The present patent application is a divisional application of patent application Ser. No. 13/545,503 filed 10 Jul. 2012 which in turn is a continuation-in-part of Ser. No. 13/274,590 filed 17 Oct. 2011.

BACKGROUND OF INVENTION

1. Field of the Invention

This invention pertains to a fiber reinforced resin composite having anti-ballistic properties and armor articles made therefrom.

2. Description of Related Art

Anti-ballistic armor articles comprising high tenacity polymeric yarns have been in use for some time. There is a continuing need to provide hard body armor articles with increased resistance to bullets and fragments while at the same time reducing the total weight of the anti-ballistic article.

Current composites used for ballistic helmets and other complex curved ballistic articles are based on the assembly of layers of high strength fabrics or non-woven packets of uni-directional fibers and resins. Composites and processes for fabrication of ballistic helmets and the like are detailed in U.S. Pat. No. 3,582,990, U.S. Pat. No. 4,596,056, U.S. Pat. No. 4,656,674, U.S. Pat. No. 4,778,638 U.S. Pat. No. 4,953,234, and U.S. Pat. No. 7,228,571. In each of these examples, the high strength fabric or non-woven packet is cut and darted to allow the fabric to take on the shape of the doubly curved article such as a helmet. These cuts and darts create a discontinuity in the protective article or cause wrinkling in the article if too few cuts and darts are used. The cuts, darts and wrinkles result in a decrease in the penetrative resistance in the article. The art describes proposed shapes, patterns, pre-forming processes, off-setting approaches and stitching of the seams, as some means to minimize these defects.

A significant need exists for a ballistic helmet, or other doubly curved article, with a minimum of cut and wrinkle flaws to allow a weight reduction and/or performance increase in the article.

The present invention provides for an anti-ballistic hard armor composite article of low areal weight and having acceptable ballistic resistance. The article can be produced without the need for folds or pleats in the fabric layers and with no or minimal cut or wrinkle flaws. The invention is particularly suitable for highly contoured articles such as a helmet, a knee protector, an arm protector and the like.

SUMMARY OF THE INVENTION

This invention pertains to a contoured fiber reinforced resin composite for ballistic protection comprising a plurality of first and second plies arranged such that a plurality of first plies is followed by a plurality of second plies, wherein, yarn orientations in the weave of each plurality of plies, are substantially aligned to each other, and wherein the plurality of first and second plies further comprise (i) a woven fabric made from a plurality of polymeric yarns having a yarn tenacity of from 15 grams per dtex to 50 grams per dtex and a modulus of from 200 grams per dtex to 2200 grams per dtex, and (ii) a polymeric resin, wherein (a) the fabric has a Russell tightness factor of from 0.2 to 0.7,
(b) the fabric has an areal weight of from 80 gsm to 510 gsm,
(c) the fabric has a cover factor of at least 0.45,
(d) the fabric is impregnated with the resin, the resin comprising from 5 to 30 weight percent of the total weight of fabric plus resin, and
(e) the fabric of each first and second ply comprises regions wherein the fabric is distorted from an orthogonal woven state by a distortion angle of least 30 degrees.

The invention is further directed to a composite comprising first, second and third plies, the third ply comprising (i) a woven fabric made from a plurality of polymeric yarns having a yarn tenacity of from 15 grams per dtex to 50 grams per dtex and a modulus of from 200 grams per dtex to 2200 grams per dtex, and (ii) a polymeric resin, wherein, (a) the surface area of a third ply is no greater than 50% of the surface area of a first and second ply,
(b) the fabric has a Russell tightness factor of from 0.2 to 0.7,
(c) the fabric has an areal weight of from 80 gsm to 510 gsm,
(d) the fabric has a cover factor of at least 0.45,
(e) the fabric is impregnated with the resin, the resin comprising from 5 to 30 weight percent of the total weight of fabric plus resin, and
(f) the ratio of the number of first plus second plies to the number of third plies in the composite is in the range of from 2:1 to 12:1.

The invention also describes a method of forming a curved fiber reinforced resin composite article comprising the above plies.

BRIEF DESCRIPTION OF THE DRAWINGS

FIG. 1A shows a perspective view of a helmet comprising a first ply.

FIGS. 1B and 1C show in further detail features of FIG. 1A.

DETAILED DESCRIPTION

Figure 2:
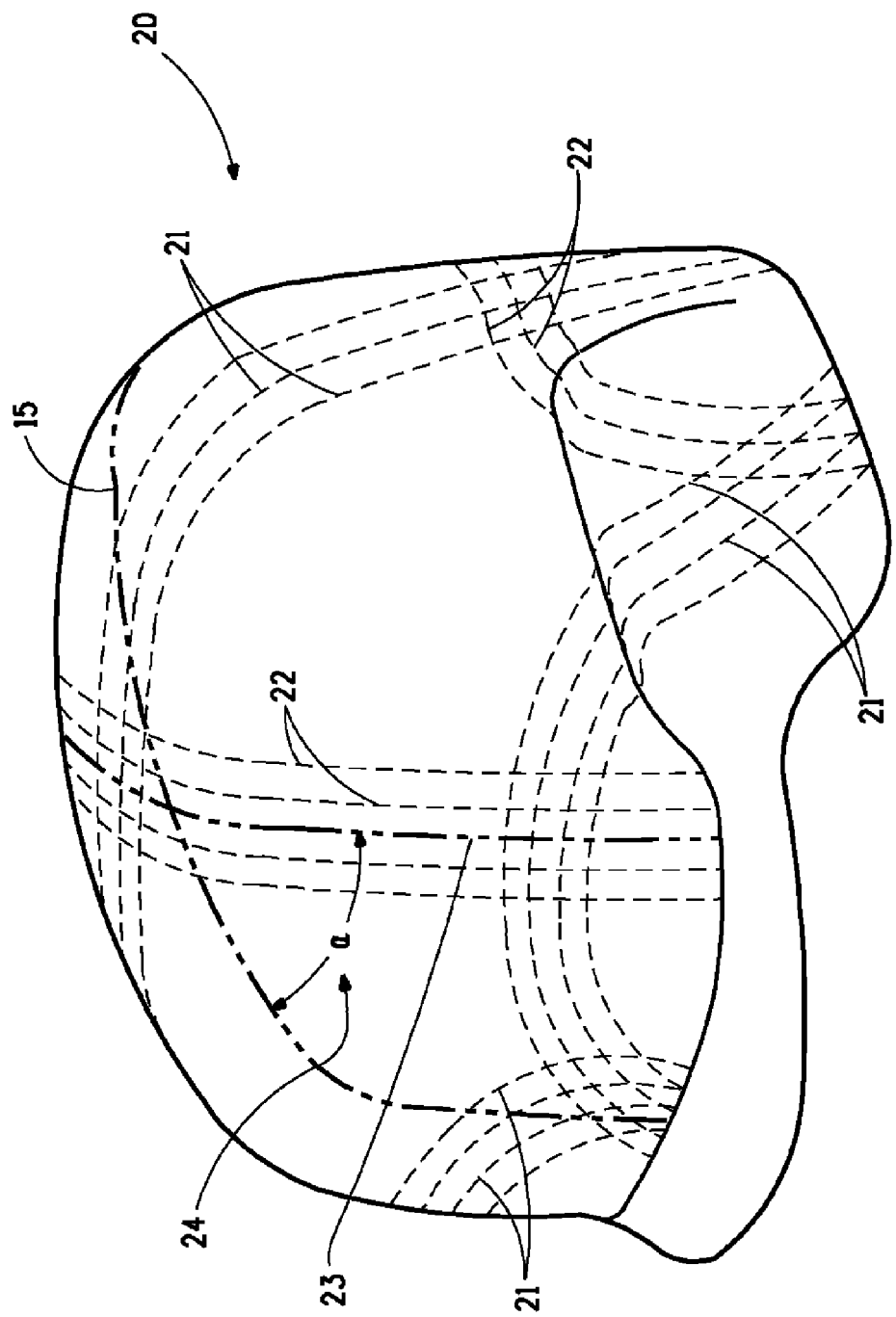
FIG. 2 shows a perspective view of a helmet comprising a second ply.

This invention pertains to a fiber reinforced resin composite comprising a woven fabric and a polymeric resin. In some embodiments the composite may comprise more than one type of woven fabric. Other embodiments may comprise a combination of woven fabric and unidirectional non-woven packets.

Woven Fabric

The term "woven" is meant herein to be any fabric that can be made by weaving; that is, by interlacing or interweaving at least two yarns typically at right angles. Generally such fabrics are made by interlacing one set of yarns, called warp yarns, with another set of yarns called weft or fill yarns. The woven fabric can have essentially any weave, such as, plain weave, crowfoot weave, basket weave, satin weave, twill weave, unbalanced weaves, and the like. In some embodiments, a satin or plain weave is preferred.

In some embodiments, each woven fabric layer has a basis weight of from 50 to 800 g/m² (1.4 to 23.5 oz./sq.yd.). In other embodiments the basis weight of each woven layer is from 70 to 600 g/m² (2.9 to 17.6 oz./sq.yd). In yet some other embodiments the basis weight of a woven layer is from 80 to 510 g/m² (4.0 to 14.7 oz./sq.yd).

In some embodiments, the fabric yarn count in the warp is 2 to 39 ends per centimeter (5 to 100 ends per inch) or even 3 to 24 ends per centimeter (8 to 60 ends/inch). In some other embodiments the yarn count in the warp is 4 to 18 ends per centimeter (10 to 45 ends/inch). In some embodiments, the fabric yarn count in the weft or fill is 2 to 39 ends per centimeter (5 to 100 ends per inch) or even 3 to 24 ends per centimeter (8 to 60 ends/inch). In some other embodiments the yarn count in the weft or fill is 4 to 18 ends per centimeter (10 to 45 ends/inch).

The fabric has a Russell tightness factor of from 0.2 to 0.7. In some embodiments the Russell tightness factor is from 0.3 to 0.5. The Russell tightness factor is a measure of the degree of fabric tightness that is present in any particular woven structure. Seyam [Textile Progress, Vol 31, No. 3, 2002] provides a review of a number of dimensionless indices that can be used to determine the tightness or firmness of a particular fabric, including Russell's Tightness Factor. The factor is calculated by the following formula:

$$C_{fabric}=(n_w+n_f)/(n_{wmax}+n_{fmax})$$

where $n_w$=warp density in the fabric (ends/cm)
$n_f$=fill density in the fabric (picks/cm)
$n_{wmax}$=maximum theoretical warp density
$n_{fmax}$=maximum theoretical fill density The maximum theoretical end and pick density are calculated using Ashenhurst's Theory of ends plus intersections also detailed in the Seyam reference. The maximum theroretical end or pick density can be determined from the following formula;

$$n_{max}=M/(M \cdot d+d)$$

where $n_{max}$=theoretical maximum warp or fill density
M=weave factor
=(ends per weave repeat)/(intersections per weave repeat)
d=Diameter of the yarn when forced into a circular cross-section.

For calculation of the yarn diameter of multifilament yarn, a packing factor must be determined. For synthetic continuous filament yarns, such as those utilized in this invention, a packing factor of 0.65 is recommended by Seyam and should be used.

If the Russell tightness is below 0.2 the fabric becomes too loosely connected to evenly form into the shape of a uniform ballistic article such as a helmet. If the tightness factor is above 0.7 the fabric structure will create excessive wrinkles or buckles as it is formed into highly complex double curavature articles such as a helmet, and ballistic performance will be reduced.

The fabric must also have a cover factor of at least 0.45. Cover factor is defined as the ratio of projected fabric surface area covered by yarns to the fabric surface area, and is given by the following equation:

$$CF=(C_w+C_f-C_w \cdot C_f)$$

Where: $C_w$=warp cover factor=$n_w \times d$
$C_f$=fill cover factor=$n_f \times d$ If the cover factor is below 0.45 then the fabric becomes too open to effectively stop small sized ballistic fragments at high velocities.

Yarns and Filaments

Fabrics are woven from multifilament yarns having a plurality of filaments. The yarns can be intertwined and/or twisted. For purposes herein, the term "filament" is defined as a relatively flexible, macroscopically homogeneous body having a high ratio of length to width across its cross-sectional area perpendicular to its length. The filament cross section can be any shape, but is typically circular or bean shaped. Herein, the term "fiber" is used interchangeably with the term "filament", and the term "end" is used interchangeably with the term "yarn".

The filaments can be any length. Preferably the filaments are continuous. Multifilament yarn spun onto a bobbin in a package contains a plurality of continuous filaments. The multifilament yarn can be cut into staple fibers and made into a spun staple yarn suitable for use in the present invention. The staple fiber can have a length of about 1.5 to about 5 inches (about 3.8 cm to about 12.7 cm). The staple fiber can be straight (i.e., non crimped) or crimped to have a saw tooth shaped crimp along its length, with a crimp (or repeating bend) frequency of about 3.5 to about 18 crimps per inch (about 1.4 to about 7.1 crimps per cm).

The yarns have a yarn tenacity of at least 7.3 grams per dtex. In some embodiments the yarns have a yarn tenacity in the range of from 10 to 65 grams per dtex or even 15 to 50 grams per dtex. The yarns have a yarn modulus of at least 100 grams per dtex. In some embodiments the yarns have a yarn modulus in the range of from 150 to 2700 grams per dtex or even 200 to 2200 grams per dtex. The yarns have a linear density of from 50 to 4500 dtex or even from 100 to 3500 dtex. The yarns have an elongation to break of from 1 to 8 percent or even from 1 to 5 percent.

The filaments of the yarns are solid, that is, they are not hollow.

Fabric Fiber Polymer

The yarns of the present invention may be made with filaments made from any polymer that produces a high-strength fiber, including, for example, polyamides, polyolefins, polyazoles, and mixtures of these.

When the polymer is polyamide, aramid is preferred. The term "aramid" means a polyamide wherein at least 85% of the amide (—CONH—) linkages are attached directly to two aromatic rings. Suitable aramid fibers are described in Man-Made Fibres—Science and Technology, Volume 2, Section titled Fibre-Forming Aromatic Polyamides, page 297, W. Black et al., Interscience Publishers, 1968.

A preferred aramid is a para-aramid. A preferred para-aramid is poly(p-phenylene terephthalamide) which is called PPD-T. By PPD-T is meant a homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloro-terephthaloyl chloride or 3,4'-diaminodiphenylether.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

Another suitable fiber is one based on aromatic copolyamide prepared by reaction of terephthaloyl chloride (TPA) with a 50/50 mole ratio of p-phenylene diamine (PPD) and 3,4'-diaminodiphenyl ether (DPE). Yet another suitable fiber is that formed by polycondensation reaction of two diamines, p-phenylene diamine and 5-amino-2-(p-aminophenyl) benzimidazole with terephthalic acid or anhydrides or acid chloride derivatives of these monomers.

When the polymer is polyolefin, polyethylene or polypropylene is preferred. The term "polyethylene" means a predominantly linear polyethylene material of preferably more than one million molecular weight that may contain minor amounts of chain branching or comonomers not exceeding 5 modifying units per 100 main chain carbon atoms, and that may also contain and mixed therewith not more than about 50 weight percent of one or more polymeric additives such as alkene-1-polymers, in particular low density polyethylene, propylene, and the like, or low molecular weight additives such as anti-oxidants, lubricants, ultraviolet screening agents, colorants and the like which are commonly incorporated. Such is commonly known as extended chain polyethylene (ECPE) or ultra high molecular weight polyethylene (UHMWPE In some preferred embodiments polyazoles are polyarenazoles such as polybenzazoles and polypyridazoles. Suitable polyazoles include homopolymers and, also, copolymers. Additives can be used with the polyazoles and up to as much as 10 percent, by weight, of other polymeric material can be blended with the polyazoles. Also copolymers can be used having as much as 10 percent or more of other monomer substituted for a monomer of the polyazoles. Suitable polyazole homopolymers and copolymers can be made by known procedures.

Preferred polybenzazoles are polybenzimidazoles, polybenzothiazoles, and polybenzoxazoles and more preferably such polymers that can form fibers having yarn tenacities of 30 gpd or greater. If the polybenzazole is a polybenzothiazole, preferably it is poly(p-phenylene benzobisthiazole). If the polybenzazole is a polybenzoxazole, preferably it is poly(p-phenylene benzobisoxazole) and more preferably poly(p-phenylene-2,6-benzobisoxazole) called PBO.

Preferred polypyridazoles are polypyridimidazoles, polypyridothiazoles, and polypyridoxazoles and more preferably such polymers that can form fibers having yarn tenacities of 30 gpd or greater. In some embodiments, the preferred polypyridazole is a polypyridobisazole. A preferred poly (pyridobisozazole) is poly(1,4-(2,5-dihydroxy)phenylene-2, 6-pyrido[2,3-d:5,6-d']bisimidazole which is called PIPD. Suitable polypyridazoles, including polypyridobisazoles, can be made by known procedures.

Polymeric Resin

By "polymeric resin" is meant an essentially homogeneous resin or polymeric material in which the yarn is embedded. The polymeric resin may be thermoset or thermoplastic or a mixture of the two. Suitable thermoset resins include phenolic, epoxy, polyester, vinyl ester and the like. Suitable thermoplastic resins include a blend of elastomeric block copolymers, polyvinyl butylral polyethylene copolymers, polyimides, polyurethanes, polyesters and the like. In some embodiments, the polyethylene copolymers comprise from 50 to 75 weight percent and the elastomeric block copolymers comprise from 25 to 50 weight percent of the resin. For example ethylene copolymers with acid monomers can be used, or alternatively any polyester of polyamide may be used. Ethylene acrylic acid copolymer is one suitable material. One skilled in the art will be able with minimal experimentation to specify a suitable polymer.

The ethylene copolymers that may be utilized in the present invention can be neutralized with an ion selected form the group consisting of sodium, potassium, lithium, silver, mercury, copper and the like and mixtures thereof. Useful divalent metallic ions include, but are not limited to, ions of beryllium, magnesium, calcium, strontium, barium, copper, cadmium, mercury, tin, lead, iron, cobalt, nickel, zinc and the like and mixtures therefrom. Useful trivalent metallic ions include, but are not limited to, ions of aluminum, scandium, iron, yttrium and the like and mixtures therefrom. Useful multivalent metallic ions include, but are not limited to, ions of titanium, zirconium, hafnium, vanadium, tantalum, tungsten, chromium, cerium, iron and the like and mixtures therefrom. It is noted that when the metallic ion is multivalent, complexing agents, such as stearate, oleate, salicylate, and phenolate radicals may be included, as disclosed within U.S. Pat. No. 3,404,134. The metallic ions used herein are preferably monovalent or divalent metallic ions. More preferably, the metallic ions used herein are selected from the group consisting of ions of sodium, lithium, magnesium, zinc and mixtures therefrom. Yet more preferably, the metallic ions used herein are selected from the group consisting of ions of sodium, zinc and mixtures therefrom. The parent acid copolymers of the invention may be neutralized as disclosed in U.S. Pat. No. 3,404,134.

By "degree of neutralization" is meant the mole percentage of acid groups on the ethylene copolymer that have a counterion. The ethylene acid copolymer utilized in the present invention is neutralized to a level of about 70% to slightly greater than 100% with one or more metal ions selected from the group consisting of potassium, sodium, lithium, magnesium, zinc, and mixtures of two or more thereof, based on the total carboxylic acid content of the acid copolymer.

A polymer or copolymer may also be applied to the fabric surface in the form of a dispersion, or a solution. The polymer or copolymer may also be plasticized. Any suitable plasticizer may be selected by one skilled in the art, for example the plasticizer is selected from the group consisting of fatty acids or fatty alcohols. A polymer or co-polymer may also be applied to the fabric in the form of a film or dry powder. Several methods may be selected by one skilled in the art to laminate the polymer to the fabric substrate.

The amount of resin in the composite is from 5 to 30 weight percent of the composite based on the total weight of resin plus fabric. In some embodiments, the resin content is from 5 to 20 weight percent. In other embodiments the resin content is from 5 to 15 weight percent. In yet another embodiment, the resin content is from 8 to 12 weight percent. The resin may be coated onto the surface of the fabric or impregnated between the yarn filaments by well known prepregging methods such as those described in section 2.9 of "Manufacturing Processes for Advanced Composites" by F. C. Campbell, Elsevier, 2004 or may be film or powder laminated to the fabric.

Preform Manufacture

For handling and process efficiency purposes, a fiber reinforced resin composite article may be assembled from a preform or a plurality of preforms. A preform is a formed but not fully consolidated resin coated or impregnated fabric (prepreg) which has the contour of the finished product. There may be a plurality of fabric layers in a preform.

Prepreg ply shapes are cut from prepreg roll stock using a knife and template, a cutting die or some other means. One layer of cut prepreg stock is called a ply. The number of shapes to be cut and the dimensions of each shape will depend on the final design of and the materials to be used in the final article. In some embodiments, there is more than one ply shape in a preform assembly.

Cut plies are stacked in the desired sequence on a preforming tool, which may be flat or contoured and made of materials such as wood, metal, plastic, fiber-reinforced plastic or ceramic. In some instances, the layers comprising the preform are bonded under temperature and pressure. Within a stack, the yarn orientations in the weave of each plurality of plies are substantially aligned to each other. By substantially aligned is meant that the yarn orientations are aligned except that some yarn non-alignment of a few degrees may arise in a ply during the ply lay-up process. Typically this non-alignment is less than ten degrees and more typically less than five degrees. One convenient processes for achieving pre-consolidation is vacuum forming or matched mold shaping. These processes are well known in the art. The amount of heat and pressure to bond the ply stack should be sufficient to allow the particular resin to reach a melt stage which permits the polymer to be infused into and through the fabric thus adhering multiple plies together and providing a cohesive and semi-rigid preform. By semi-rigid we mean that the preform is both noticeably stiffer than the prepreg and sufficiently stiff to prevent individual fabric layers from buckling and causing wrinkles during final consolidating in the molding tool. A single preforming step is sufficient to provide the desired compaction and inter-ply coherence to the preform.

In some instances, bonding of the layers comprising the preform is achieved by saturation with a liquid resin in a process commonly know as wet lay-up. These processes are well know in the art. The wet resin soaked layers are layered on the preforming tool to create the desired contoured shape, and solvents are removed and/or the resin level of cure is advanced to create the rigid preform.

Article Manufacture

A plurality of individual plies or preforms are stacked in a desired sequence on a molding tool having the dimensions of the finished article. The tool is contoured and made of materials such as metal, plastic, fiber-reinforced plastic or ceramic. The desired number of preforms in the final assembly will vary according to the laminate design and the number of plies in each preform. The number of plies in a laminate varies from 2 to 500, or from 20 to 150 or even from 30 to 120. In a preferred embodiment, there are from 10 to 70 plies in the final assembly. In some embodiments, the number of plies comprising the plurality of first or second plies is from 2 to 250 or from 5 to 35 or from 10 to 75 or even from 15 to 60. In some other embodiments, the number of plies comprising the plurality of first or second plies is from 2 to 50 or from 5 to 50.

Final consolidation is carried out under temperature and pressure. The temperature can be from 115° C. to 230° C., or from 120° C. to 170° C. or even from 140° C. to 160° C. The desired consolidation pressure is achieved by applying a force of from 34 to 800 tonnes or from 200 to 600 tonnes or even from 400 to 650 tonnes. Once at temperature, the temperature is maintained for a specified number of minutes before cooling is initiated. The temperature hold time can be from 5 min to 60 min, or from 5 min to 30 min or even from 7 min to 22 min. The molding of the composite laminate may be carried out in a platen press, an autoclave, a matched mold or under vacuum in an oven, such techniques being well known to those skilled in the art. For a thermoplastic polymeric resin, the amount of heat required should be sufficient to allow the particular thermoplastic to reach a melt stage. The applied pressure should be sufficient to cause good compaction of the plies such that there are minimal voids in the finished laminate. Voids may be detected by methods such as ultrasonic scanning or x-rays. Preferably, the finished laminate is removed from the mold after it has cooled to room temperature. This allows the resin to fully solidify before removal from the mold. After removal of the cured laminate from the mold, the laminate is trimmed and sent for finishing operations such as installation of fittings and painting.

In one embodiment, the fiber reinforced resin composite article is formed from first and second plies. FIG. 1A shows generally at 10 the contoured shape of a helmet comprising a first ply. The warp and fill (weft) yarns are shown respectively at 11 and 12. Over the majority of the surface area of the first ply, the warp and fill yarns are orthogonal or essentially orthogonal to each other. By "essentially" orthogonal is meant that the warp and fill yarns are within a few degrees of being orthogonal to each other, for example within five or ten degrees. An example of an orthogonal yarn intersection is shown at 13 in FIG. 1B. Extending or trellising the corners or edges of a ply produces a ply having regions where the warp and fill yarns become distorted from an orthogonal intersection as in the original woven state. This angle of yarn distortion is referred hereto as a distortion angle and is shown as $\Psi$ at 14 in FIG. 1C. It is preferable that the distortion angle is at least 30 degrees or even 40 degrees. A phantom center reference line for the first ply is shown at 15. It is not unusual for significant distortion and folding to occur at and/or around the outer edges of the finished article, resulting from manufacturing imperfections. For this reason, when determining the distortion angle present in any article, the regions within 25.4 mm (1 inch) of the edges should be excluded.

FIG. 2 shows generally at 20 a second ply having warp yarns 21 and fill yarns 22. The majority of the warp and fill yarns are oriented orthogonally or essentially orthogonally to each other but, as described for FIG. 1, trellising the fabric of a second ply produces regions in the ply wherein the fabric is distorted from an orthogonal woven state by a distortion angle of least 30 degrees. A phantom center reference line for the second ply is shown at 23.

During assembly of the composite article, it is preferable that the yarn orientation of the second ply is offset at an angle, alpha, of from 20 to 70 degrees with respect to the yarn orientation of the first ply. More preferably, the second ply is offset at an angle, alpha, of from 40 to 50 degrees with respect to the first ply. In an even more preferred embodiment, the second ply is offset at an angle, alpha, of from 45 degrees with respect to the first ply. This offset angle is shown at 24 in FIG. 2 with respect to centre reference lines 15 for the first ply and 23 for the second ply.

In one embodiment, the first and second plies are stacked in an alternating sequence and are oriented at from 20 to 70 degrees with respect to each other. The first and second plies have a shape profile similar to the final shape profile of the article being formed.

Figure 6A:
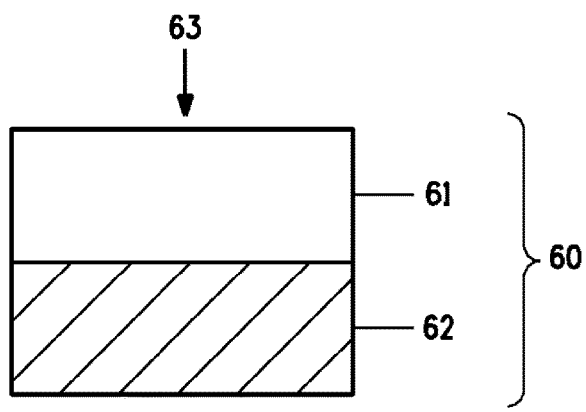
FIGS. 6A and 6B represent a cross section through a resin composite.
Figure 6B:
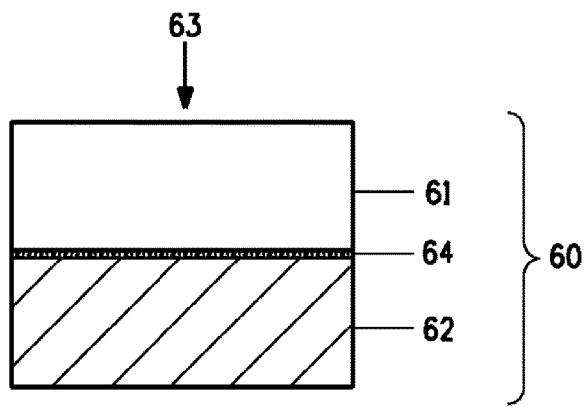
Figure 7A:
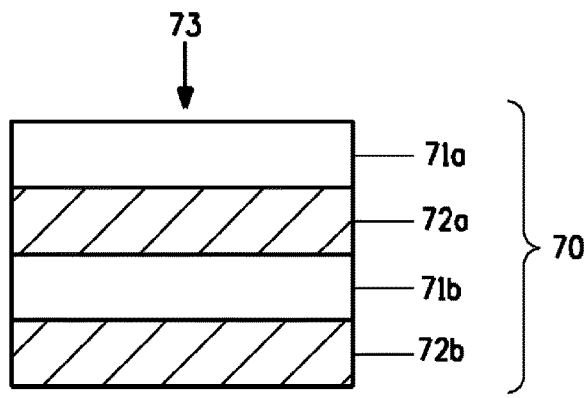
FIGS. 7A and 7B represent an alternative cross section through a resin composite.
Figure 7B:
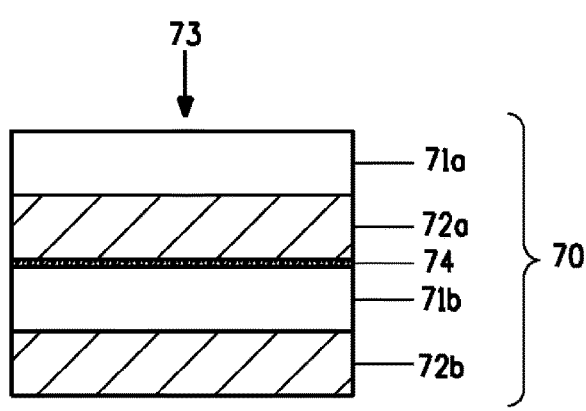

In another embodiment, the composite comprises a plurality of first plies followed by a plurality of second plies. Such a composite may comprise a single plurality of first plies followed by a single plurality of second plies or the composite may comprise a repeat pattern of alternating pluralities of first and second plies. FIGS. 6A and 6B show generally at 60 a cross section through a resin composite comprising a plurality of first plies 61 as per FIG. 1A followed by a plurality of second plies 62 as per FIG. 2. The plurality of first plies 61 is facing the projectile 63. FIGS. 7A and 7B show generally at 70 a cross section through a resin composite comprising a plurality of first plies 71a followed by plurality of second plies 72a followed by a plurality of first plies 71b followed by plurality of second plies 72b.

Figure 3:
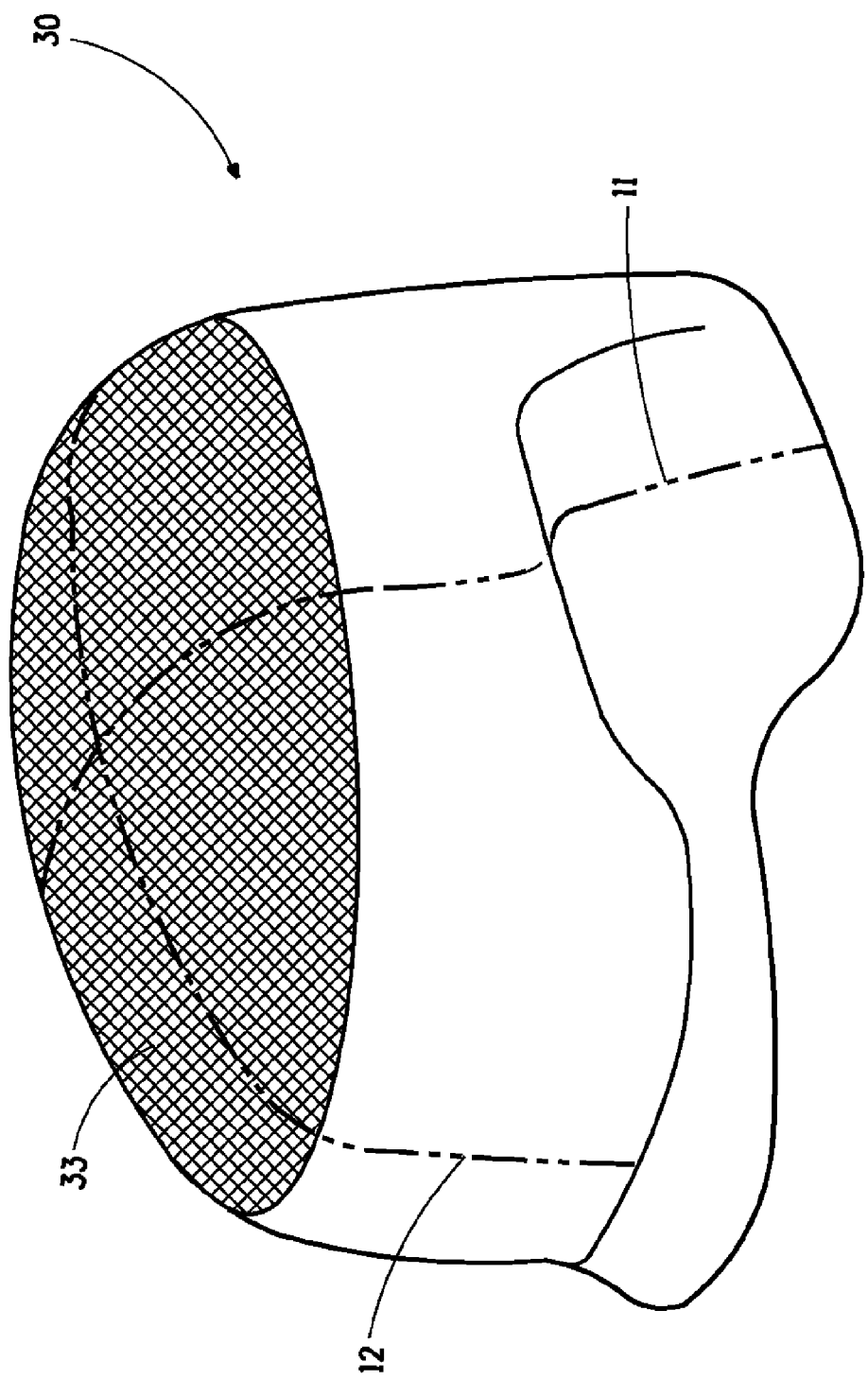
FIG. 3 shows a perspective view of a helmet comprising a third ply.

In yet another embodiment, the fiber reinforced resin composite article comprises a third ply which is shown at 33 in FIG. 3. Also shown in this figure are the principal warp 11 and fill 12 yarn directions of a first ply. A requirement of the third ply is that it has a surface area no greater than 50% of the surface area of a first or second ply, If the surface area of the third ply is greater than 50% uniformity in material distibution will not be maintained. During assembly of the first, second and third plies, the number of third plies is such that the ratio of the number of first plus second plies to the number of third plies in the composite is in the range of from 2:1 to 12:1 or 3:1 to 12:1 or even 4:1 to 12:1, The third plies are interspersed at a predetermined frequency throughout the assembly of first and second plies, for example as every fifth or sixth ply. Preferably, the orientation of the yarns of the third ply is similar to the orientation of yarns in an adjacent ply. For example, if a third ply is located between any two first plies, then the yarn orientation in the third ply is the same as the orientation of yarns of a first ply. Similarly, if a third ply is located between any two second plies, then the yarn orientation in the third ply is the same as the orientation of yarns of a second ply. The prime function of the third ply is to maintain uniformity in the distribution of material throughout the article. The shape of the third play may be any convenient shape such as circular, oval, square, rectangular, diamond, pentagonal, hexagonal, octagonal or cross shaped.

A third ply may also be located at the intersection between a plurality of first plies and plurality of second plies as exemplified by 64 and 74 in FIGS. 6B and 7B respectively. A third ply located at the intersection between a plurality of first plies and plurality of second plies may take the shape of any third ply located between any of the first plies or between any of the second plies or it may be different from both.

Preferably, the number of first, second and, optionally, third plies is such that in the regions of the fabric assembly where the yarns are not distorted, there is an equal balance of yarn oriention between the different plies.

In one embodiment, a method of making a curved fiber reinforced resin composite article comprises the steps of
 (i) providing a roll of resin impregnated fabric composite comprising a woven fabric made from a plurality of polymeric yarns having a yarn tenacity of from 15 grams per dtex to 50 grams per dtex and a modulus of from 200 grams per dtex to 2200 grams per dtex, and a polymeric resin, wherein
  (a) the fabric has a Russell tightness factor of from 0.2 to 0.7,
  (b) the fabric has an areal weight of from 80 gsm to 510 gsm,
  (c) the fabric has a cover factor of at least 0.5, and,
  (d) the fabric is impregnated with the polymeric resin, the resin comprising from 5 to 30 weight percent of the of the total weight of fabric plus resin,
 (ii) cutting a plurality of plies from the fabric composite roll to provide first and second plies such that the plies have a shape profile similar to the final shape profile of the article being formed,
 (iii) cutting a plurality of plies from the fabric composite roll to provide third plies such that the surface area of a third ply is no greater than 50% of the surface area of the first or second plies,
 (iv) tensioning the corners or edges of the first and second plies to cause regions of the ply to distort by a distortion angle of at least 30 degrees,
 (v) assembling a plurality of first plies followed by a plurality of second plies with third plies interspersed at a pre-determined frequency within the pluralities of first and second plies such that the ratio of the number of first plus second plies to the number of third plies is in the range of from 2:1 to 12:1 and the orientation of a second ply is offset at an angle of from 20 to 70 degrees with respect to the orientation of a first ply, and
 (vi) consolidating the assembly of step (v) at a temperature of from 115° C. to 230° C. and an applied force of from 34 to 800 tonnes for between 5 to 60 minutes to form a cured composite article.

In another embodiment, a method of making a curved fiber reinforced resin composite article comprises the steps of
 (i) providing a roll of resin impregnated fabric composite comprising a woven fabric made from a plurality of polymeric yarns having a yarn tenacity of from 15 grams per dtex to 50 grams per dtex and a modulus of from 200 grams per dtex to 2200 grams per dtex, and a polymeric resin, wherein
  (a) the fabric has a Russell tightness factor of from 0.2 to 0.7,
  (b) the fabric has an areal weight of from 80 gsm to 510 gsm,
  (c) the fabric has a cover factor of at least 0.5, and,
  (d) the fabric is impregnated with the polymeric resin, the resin comprising from 5 to 30 weight percent of the of the total weight of fabric plus resin,
 (ii) cutting a plurality of plies from the fabric composite roll to provide first and second plies such that the plies have a shape profile similar to the final shape profile of the article being formed,
 (iii) cutting a plurality of plies from the fabric composite roll to provide third plies such that the surface area of a third ply is no greater than 50% of the surface area of the first or second plies, the third plies having at least two different shapes,
 (iv) tensioning the corners or edges of the first and second plies to cause regions of the ply to distort by a distortion angle of at least 30 degrees,
 (v) assembling a plurality of first plies followed by a plurality of second plies with third plies interspersed at a pre-determined frequency within the pluralities of first and second plies such that the ratio of the number of first plus second plies to the number of third plies is in the range of from 2:1 to 12:1, the orientation of a second ply is offset at an angle of from 20 to 70 degrees with respect to the orientation of a first ply, the third plies interspersed within a plurality of first or second plies have the same orientation as the plies between which they are interspersed, and
 (vi) consolidating the assembly of step (v) at a temperature of from 115° C. to 230° C. and an applied force of from 34 to 800 tonnes for between 5 to 60 minutes to form a cured composite article.

A contoured fiber reinforced resin composite article having a uniform distribution of material can be produced from first, second and third plies as described above without the need for cuts, darts, pleats or folds in any of the plies.

An antiballistic article may also be produced as a hybrid construction comprising composites as described above plus fabrics of another construction. One example of another construction is a nonwoven fabric comprising polyolefin yarns oriented in a unidirectional arrangement. These nonwoven materials may be obtained from DSM Dyneema or Honeywell. In a preferred embodiment of a hybrid construction, the layers of polyolefin yarns are in a strike facing direction and the layers of woven fabrics in a body facing direction.

Test Methods

Ballistic Penetration Performance:

Ballistic tests of the composite laminate were conducted in accordance with standard procedures MIL STD-662F (V50 Ballistic Test for Armor, 18 Dec. 1997) and NIJ STD 0106.01 (Ballistic Helmets). Tests were conducted using 16 grain fragment simulating projectiles (FSPs) against the composite laminate targets. The projectiles were compliant with MIL DTL 46593B. One article was tested for each examples with 10 shots, at zero degree obliquity, fired at each target. The reported V50 values are average values for the number of shots fired for each example. V50 is a statistical measure that identifies the average velocity at which a bullet or a fragment penetrates the armor equipment in 50% of the shots, versus non penetration of the other 50%. The parameter measured is V50 at zero degrees where the degree angle refers to the obliquity of the projectile to the target.

EXAMPLES

Materials:

A 4-harness satin weave Kevlar® fabric was was acquired from JPS Composites, Anderson, S.C. The fabric had an areal weight of 146.4 gsm, a yarn count of 7.87 ends per cm (20 ends per inch) in the warp, a yarn count of 7.87 ends per cm (20 ends per inch) in the weft, a cover factor of 0.48 and a Russell tightness factor of 0.35. The fabric was woven from Kevlar® 129, 840 denier para-aramid yarn available from E. I. DuPont de Nemours and Company, Wilmington, Del. The yarn had a nominal yarn tenacity of 29 grams per dtex and a yarn modulus of 820 grams per dtex A plain weave Kevlar® fabric was acquired from JPS Composites, Anderson, S.C. The fabric had an areal weight of 152.1 gsm, a yarn count of 7.87 ends per cm (20 ends per inch) in the warp, a yarn count of 7.87 ends per cm (20 ends per inch) in the weft, a cover factor of 0.48 and a Russell tightness factor of 0.56. The fabric was woven from Kevlar® 129, 840 denier para-aramid yarn available from E. I. DuPont de Nemours and Company, Wilmington, Del. The yarn had a nominal yarn tenacity of 29 grams per dtex and a yarn modulus of 820 grams per dtex Dyneema® HB 26 is a roll product consisting of four crossed plies of unidirectionally oriented polyethylene yarns embedded in resin. This nonwoven material was obtained from DSM Dyneema, Stanley, N.C. This four-ply sheet had an areal weight of 260 gsm, (0.053 psf). The type of fiber used in this material is reported in the literature to have a nominal tenacity of about 44 grams per dtex and a modulus of about 1400 grams per dtex.

Example 1

The 4 harness satin weave fabric described above was impregnated with a thermoplastic resin dispersion, Michem® Prime 2960, to make a suitable wet prepreg for manufacture of a helmet shaped composite. The resin is available from Michelman Inc., Cincinnati, Ohio. The dry resin content of the prepreg was 8 percent by weight of the fabric plus the dry resin. The resin is an ethylene/acrylic acid copolymer. Plies for creating a helmet shaped article were made by cutting either 432 mm×432 mm squares or 230 mm diameter circles.

A first fabric square ply was draped over a male mold plug that modeled the shape of a medium sized Personnel Armor System for Ground Troops (PASGT) helmet. Each of the 4 corners of the first ply were tensioned so as to cause the fabric to distort and conform to the shape of the helmet mold as it was draped in place. A second fabric ply was then placed on top of the first fabric ply. This second ply was also conformed to the shape of the mold by distorting the fabric plies through tensioning of the corners. The orientation of the second ply was, prior to draping, rotated by 45 degrees with respect to the orientation of the first ply. A total of 46 square plies were positioned in a similar alternating manner between the two orientations of first and second plies to create the shaped helmet preform. In addition to the distorted square plies, a total of nine circular crown plies, third plies, 230 mm in diameter, were also added, one crown ply for each five of the square plies. The circular crown plies were centered on the top of the article. Each crown ply had and area of approximately 410 square centimeters. These plies covered approximately 33% of the molded PASGT helmet shape or approximately 40% of the surface area of the first and second plies.

The assembly of 55 plies was removed from the mold plug and was placed in a vacuum oven, heated to 110 degrees C. and dried for 3 hours to remove the water from the polymer coating. The dried assembly of polymer coated fabrics was placed in a matched die PASGT helmet compression mold with a gap of 6.86 mm and pressed at a temperature of 141 degrees C. and with 455 tonnes force. The molded was bumped open once during the molding process to release any volatiles and then held under those conditions for 15 minutes. While still under pressure, the compressed assembly was rapidly cooled to 38 degrees C. to complete consolidation of the structure. The shell had a molded weight of 1.04 kg, with an average thickness of 7.19 mm. This weight translates to a PASGT helmet weight of 0.95 kg.

The outer plies of the formed helmet were examined and a maximum distortion angle of 55 degrees was noted in the regions of the helmet that had been distorted to create the seamless contoured ply shape. The regions within 25.4 mm of the trimmed helmet edge were ignored for this measurement to exclude any edge effects in the measurement. The helmet was assembled without cuts, darts, pleats or folds in the first, second and third plies.

The molded helmet was tested to determine its ballistic resistance against a 16 grain Right Circular Cylinder (RCC) Fragment Simulated Projectile (FSP). The lightweight helmet had a $V_{50}$ value of 831 m/s that surpassed by 91 m/s the performance standard published by MSA for ACH TC2000 series helmets Example 2

The plain weave fabric described above was was impregnated with a thermoplastic resin dispersion, Michem® Prime 2960, to make a suitable wet prepreg. The dry resin content of the prepreg was 8.5 percent by weight of the fabric plus the dry resin. Plies for creating a helmet shaped article were made by cutting either 432 mm×432 mm squares or 230 mm diameter circles.

A medium sized PASGT helmet preform was created as described in Example 1, by wet lay-up of the square and circular ply shapes. A total of 55 plies were again used to create the helmet preform. The ply sequencing and orientation of the first, second and third plies was as in Example 1. The preform was similarly dried, and pressed as in Example 1 to create a medium PASGT shaped helmet shell. A finished helmet was cut to the contours of a typical Advanced Combat Helmet. The final helmet had a trimmed weight of 1.06 kg, with an average thickness of 7.06 mm. The outer plies of the formed helmet were examined and a maximum distortion angle of 40 degrees was noted in the regions of the helmet that had been distorted to create the seamless contoured ply shape. The regions within 25.4 mm of the trimmed helmet edge were ignored for this measurement to exclude any edge effects in the measurement. The helmet was assembled without cuts, darts, pleats or folds in the first, second and third plies.

The molded helmet was tested to determine its ballistic resistance against a 16 grain Right Circular Cylinder Fragment Simulated Projectile. The lightweight helmet had a $V_{50}$ value of 832 m/s that surpassed by 92 m/s the performance standard given by MSA for ACH TC2000 series helmets.

Example 3

Figure 4:
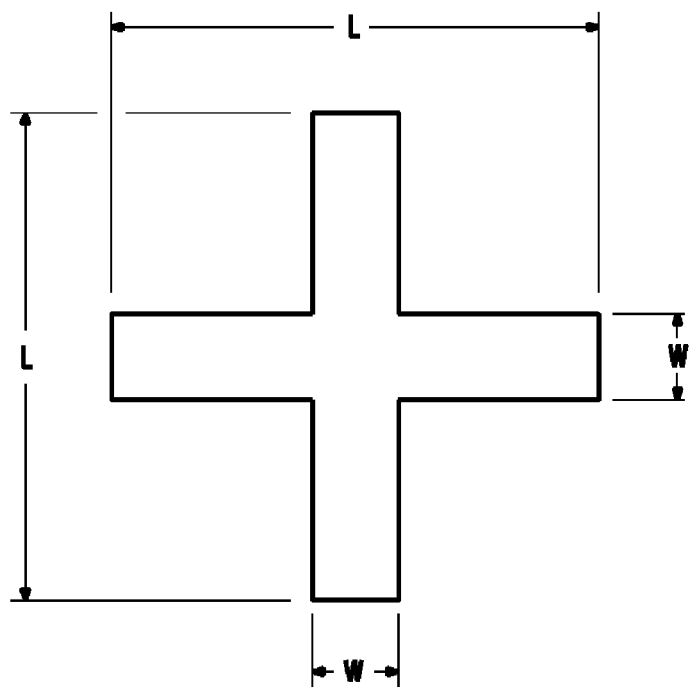
FIG. 4 represents a cross shaped ply of Example 3.
Figure 5:
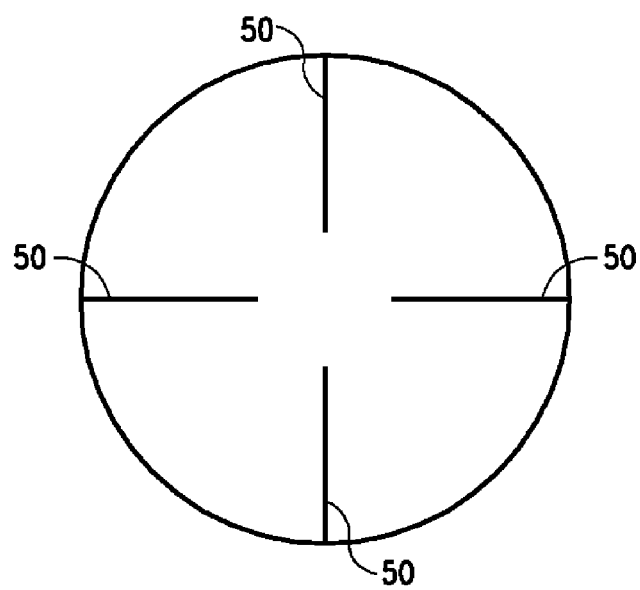
FIG. 5 represents a circular shaped ply of Example 3.

Eight sheets of Dyeema® HB-26 were cut into circular plies having a diameter of 483 mm. Four slots each having a length of 165 mm were cut into each circular ply as shown at 50 in FIG. 5. A further eight sheets were cut in the shape of a cross. Plies cut in the shape of a cross all had a length of 483 mm and a width of 108 mm as shown as L and W respectively in FIG. 4. The sixteen plies (8 circles and 8 crosses) were lightly tacked into a net helmet shape with an ultrasonic welding tool and stacked in an alternating fashion. The assembled stack was placed into a matched die PASGT helmet compression mold with a gap of 8.13 mm which was preheated to 129 degrees C. and the mold closed for 15 seconds, just long enough to make a partially consolidated first sub-assembly which was then immediately removed from the mold.

The 4 harness satin weave aramid fabric previously described was impregnated with Michem® Prime 2960 resin to make a wet prepreg. The dry resin content of the prepreg was 8 weight percent based on the total weight of fabric plus resin. The prepreg was cut into either 432 mm×432 mm squares or 230 mm diameter circles. There were 22 square and 4 circular plies that were assembled over a male mold plug in a similar manner as described in Example 1 to form a second sub-assembly comprising first, second and third plies. The circular crown plies were centered on the top of the second sub-assembly. This second sub-assembly was then removed from the mold plug and placed in a vacuum oven, heated to 110 degrees C. and dried for 3 hours to remove the water from the polymer coating. The second sub-assembly was placed into a matched die PASGT helmet compression mold with a gap of 8.13 mm which was preheated to 129 degrees C. and the mold closed for 15 seconds, just long enough to make a partially consolidated second sub-assembly which was then immediately removed from the mold A final helmet assembly was made by inserting the second sub-assembly inside the first sub-assembly and placing the combined assembly into a matched die PASGT helmet compression mold with a gap of 8.13 mm. The mold was preheated to a temperature of 129 degrees C. and held for 20 minutes to consolidate the two sub-assemblies into a final assembly. While still under pressure, the compressed assembly was rapidly cooled to 38 degrees C. and this temperature maintained for 40 minutes to complete consolidation of the structure. The resulting helmet shell was cut to the contours of a typical Advanced Combat Helmet. The final helmet shell had a molded weight of 0.85 kg. Fifty percent of this weight was comprised of Dyneema®HB 26 and fifty percent of this weight was comprised of the resin impregnated aramid fabric. The average thickness of the shell was 7.95 mm. The inner plies of the formed helmet shell were examined and a maximum distortion angle of 40 degrees was noted in the regions of the helmet that had been distorted to create the seamless contoured ply shapes. The regions within 25.4 mm of the trimmed helmet edge were ignored for this measurement to ignore any edge effects in the measurement. The helmet was assembled without cuts, darts, pleats or folds in the woven fabrics of the second sub-assembly.

The molded helmet shell was tested to determine its ballistic resistance against a 16 grain Right Circular Cylinder Fragment Simulated Projectile. The layers of polyethylene formed the outer strike facing section of the final assembly and the layers of aramid fabric formed the inner back facing section. The lightweight helmet had a $V_{50}$ value of 767 m/s that surpassed by 53 m/s the performance standard given by MSA for ACH TC2000 series helmets.

The ballistic results for these examples are summarized in Table 1.

TABLE 1

| Example | Helmet Description | Shell Weight (kg) | V50 (m/s) |
|---|---|---|---|
| Control | ACH TC2000 Series Datasheet Value | 1.10 | 739 |
| 1 | Aramid Satin Weave Fabric | 0.95* | 831 |
| 2 | Aramid Plain Weave Fabric | 1.05 | 832 |
| 3 | Hybrid of Polyethylene and Aramid | 0.85 | 767 |

*indicates an ACH equivalent weight.

Example 4

The 4-harness satin weave fabric previously described was impregnated with a thermoplastic resin dispersion, Michem® Prime 2960, to make a suitable wet prepreg for manufacture of a helmet shaped composite. The dry resin content of the prepreg was 8 percent by weight of the fabric plus the dry resin. Plies for creating a helmet shaped article were made by cutting either 432 mm×432 mm squares or 230 mm diameter circles.

A fabric square ply (first ply) was draped over a male mold plug that modeled the shape of a medium sized light weight advanced combat helmet (LW ACH). Each of the 4 corners of the first ply were tensioned so as to cause the fabric to distort and conform to the shape of the helmet mold as it was draped in place. A further three first plies were then placed, in the same orientation, on top of the first fabric ply. These additional plies were also conformed to the shape of the mold by distorting the fabric plies through tensioning of the corners. A circular ply (third ply) was then placed on top of the four first plies. The ply lay-up process was repeated four times to give a first stack comprising a total of twenty first plies and five third plies, the first plies all having a common yarn alignment. A fabric square ply (second ply) was draped on to the first stack such that the yarn orientation of the second ply was, prior to draping, at an angle of 45 degrees with respect to the yarn orientation of the first plies. A further three second plies were added in exactly the same manner followed by a circular ply (third ply). The ply lay-up process was repeated four times to give a second stack comprising a total of twenty second plies and five third plies, the second plies all having a common yarn alignment. All third plies in the first and second stacks were centered on the top of the article and covered approximately 40% of the surface area of the first and second plies.

The combined first and second stacks formed the shaped helmet preform.

The helmet preform was removed from the mold plug and was placed in a vacuum oven, heated to 110 degrees C. and dried for 3 hours to remove the water from the polymer coating. The dried assembly of polymer coated fabrics was placed in a matched die ACH style helmet compression mold with a gap of 6.2 mm and pressed at a temperature of 141 degrees C. and with 455 tonnes force. The mold was opened once during the molding process to release any volatiles and then held under those conditions for 15 minutes. While still under pressure, the compressed assembly was rapidly cooled to 38 degrees C. to complete consolidation of the structure. The shell had a molded weight of 0.813 kg and had an average thickness of 6.28 mm. After cutting to roughly ACH contours, the helmet weighed 0.766 kg.

The outer plies of the formed helmet were examined and a maximum distortion angle of 55 degrees was noted in the regions of the helmet that had been distorted to create the seamless contoured ply shape. The regions within 25.4 mm of the trimmed helmet edge were ignored for this measurement to exclude any edge effects in the measurement. The helmet was assembled without cuts, darts, pleats or folds in the first, second and third plies.

The molded helmet was tested to determine its ballistic resistance against a 16 grain Right Circular Cylinder (RCC) Fragment Simulated Projectile (FSP). The lightweight helmet had a $V_{50}$ value of 777 m/s that surpassed by 37 m/s the performance standard published by MSA for ACH TC2000 series helmets

Example 5

Example 5 is similar to Example 4 except that the preform can comprise a total of forty eight plies of fabric arranged in a repeat sequence of three first plies followed by three second plies, this pattern being repeated eight times. The yarn orientation of the second plies is, prior to draping, at an angle of 45 degrees with respect to the yarn orientation of the first plies.

Example 6

Example 6 is similar to Example 4 except that the preform can comprise a total of forty nine plies of fabric arranged in a repeat sequence of three first plies followed by three second plies followed by one third ply, this pattern being repeated seven times. The yarn orientation of the second plies is, prior to draping, at an angle of 45 degrees with respect to the yarn orientation of the first plies.

The results show that a helmet construction comprising woven fabrics having a Russell tightness factor of from 0.2 to 0.7 and a cover factor of at least 0.45 meet the specified anti-ballistic performance estandars. Since the helmets are made without cuts, darts, pleats or folds in the plies there is a reduction in the number of potential weak zones that could adversely impact performance in the field.

What is claimed is:

1. A method of forming a curved fiber reinforced resin composite article comprising the steps of
   (i) providing a roll of resin impregnated fabric composite comprising a woven fabric made from a plurality of polymeric yarns having a yarn tenacity of from 15 grams per dtex to 50 grams per dtex and a modulus of from 200 grams per dtex to 2200 grams per dtex, and a polymeric resin, wherein
       (a) the fabric has a Russell tightness factor of from 0.2 to 0.7,
       (b) the fabric has an areal weight of from 80 gsm to 510 gsm,
       (c) the fabric has a cover factor of at least 0.5, and,
       (d) the fabric is impregnated with the polymeric resin, the resin comprising from 5 to 30 weight percent of the of the total weight of fabric plus resin,
   (ii) cutting a plurality of plies from the fabric composite roll to provide first and second plies such that the plies have a shape profile similar to the final shape profile of the article being formed,
   (iii) cutting a plurality of plies from the fabric composite roll to provide third plies such that the surface area of a third ply is no greater than 50% of the surface area of the first or second plies,
   (iv) extending or trellising the corners or edges of the first and second plies over a contoured tool to cause regions in the weave of the ply to distort by a distortion angle of at least 30 degrees,
   (v) assembling, into a contoured shaped preform, a plurality of first plies followed by a plurality of second plies with third plies interspersed at a pre-determined frequency within the pluralities of first and second plies such that the ratio of the number of first plus second plies to the number of third plies is in the range of from 2:1 to 12:1 and the orientation of a second ply is offset at an angle of from 20 to 70 degrees with respect to the orientation of a first ply,
   (vi) assembling a plurality of contoured preforms in a desired sequence on a molding tool, and
   (vii) consolidating the assembly of step (vi) at a temperature of from 115° C. to 230° C. and an applied force of from 34 to 800 tonnes for between 5 to 60 minutes to form a cured composite article.

2. The method of claim 1 wherein the polymer of the yarns of the first, second and third plies is para-aramid, polyethylene, polyazole or mixtures thereof.

3. The method of claim 1 wherein the fabric of each first and second ply comprises regions wherein the fabric is distorted from an orthogonal woven state by a distortion angle of least 40 degrees.

4. A method of forming a curved fiber reinforced resin composite article comprising the steps of
   (i) providing a roll of resin impregnated fabric composite comprising a woven fabric made from a plurality of polymeric yarns having a yarn tenacity of from 15 grams per dtex to 50 grams per dtex and a modulus of from 200 grams per dtex to 2200 grams per dtex, and a polymeric resin, wherein
       (a) the fabric has a Russell tightness factor of from 0.2 to 0.7,
       (b) the fabric has an areal weight of from 80 gsm to 510 gsm,
       (c) the fabric has a cover factor of at least 0.5, and, (d) the fabric is impregnated with the polymeric resin, the resin comprising from 5 to 30 weight percent of the of the total weight of fabric plus resin, (ii) cutting a plurality of plies from the fabric composite roll to provide first and second plies such that the plies have a shape profile similar to the final shape profile of the article being formed, (iii) cutting a plurality of plies from the fabric composite roll to provide third plies such that the surface area of a third ply is no greater than 50% of the surface area of the first or second plies, the third plies having at least two different shapes, (iv) extending or trellising the corners or edges of the first and second plies over a contoured tool to cause regions in the weave of the ply to distort by a distortion angle of at least 30 degrees, (v) assembling, into a contoured shaped preform, a plurality of first plies followed by a plurality of second plies with third plies interspersed at a pre-determined frequency within the pluralities of first and second plies such that the ratio of the number of first plus second plies to the number of third plies is in the range of from 2:1 to 12:1, the yarn orientation of a second ply is offset at an angle of from 20 to 70 degrees with respect to the yarn orientation of a first ply, the third plies interspersed within a plurality of first or second plies have the same orientation as the plies between which they are interspersed, (vi) assembling a plurality of contoured preforms in a desired sequence on a molding tool, and (vii) consolidating the assembly of step (vi) at a temperature of from 115° C. to 230° C. and an applied force of from 34 to 800 tonnes for between 5 to 60 minutes to form a cured composite article.

5. The method of claim 4 further comprising the step of positioning a third ply at the intersection of a plurality of first plies and a plurality of second plies.

\* \* \* \* \*